May 25, 1954 H. W. EHLER 2,679,100
KNIFE
Filed Sept. 29, 1951
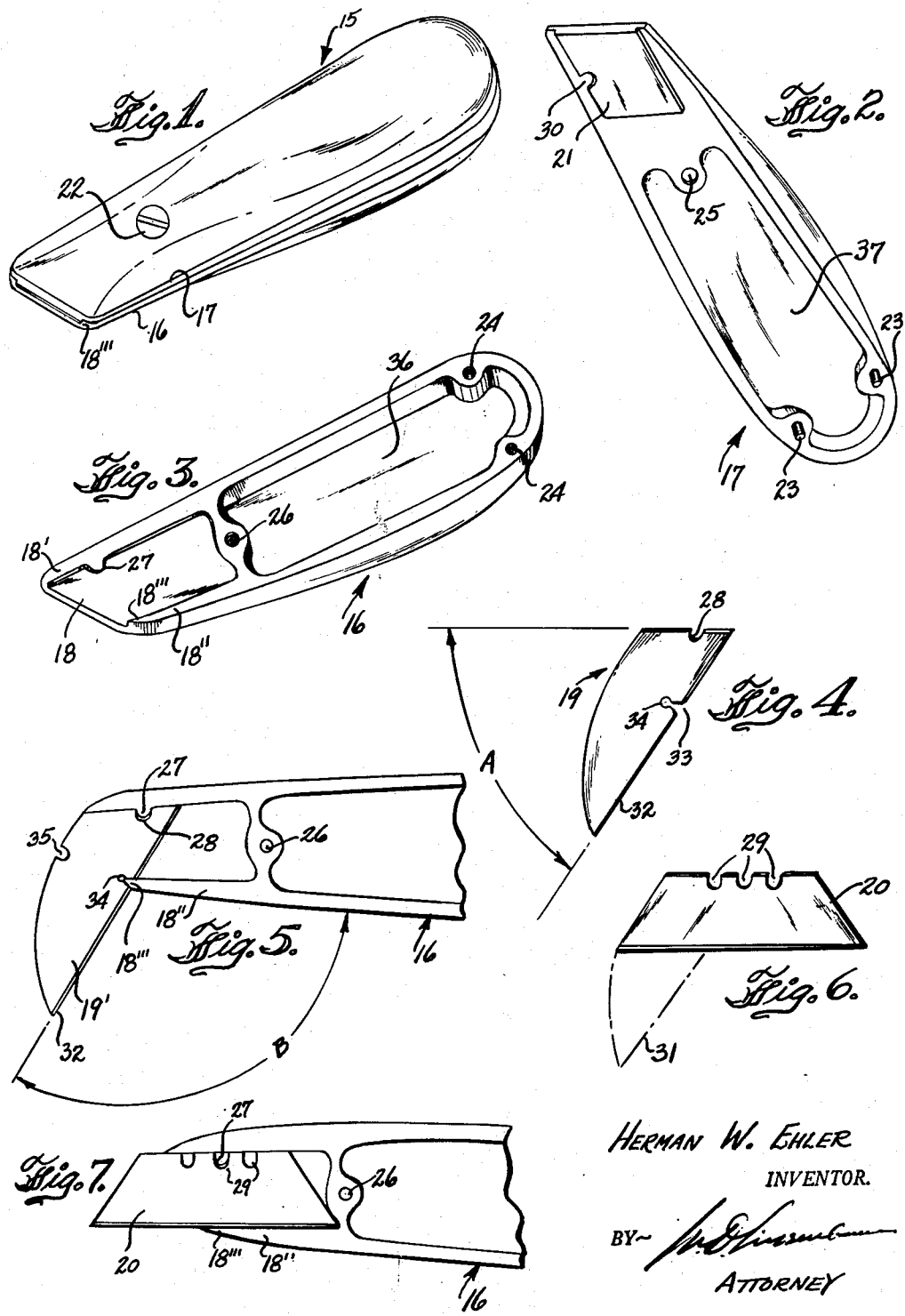
HERMAN W. EHLER
INVENTOR.
BY~
ATTORNEY Patented May 25, 1954

2,679,100

UNITED STATES PATENT OFFICE 2,679,100

KNIFE

Herman W. Ehler, Garden City, N. Y., assignor to General Hardware Mfg. Co. Inc., New York, N. Y., a corporation of New York Application September 29, 1951, Serial No. 248,913

3 Claims. (Cl. 30—337)

The present invention relates to a knife for cutting linoleum and the like, and more particularly to the type comprising a handle holding a removable blade.

An object of this invention is to provide novel and improved blade and handle structures to form knives where the blade extends longitudinally of the handle, and novel and improved blade forms which are set to extend angularly with respect to the longitudinal line of the handle whereby the resulting knife is of the linoleum-cutting type, and if desired, such blades may be of the form to be selectively set in the handle in both such mentioned positions to be used either as a straight knife or as a linoleum cutter.

A further object hereof is to provide blades for the purposes mentioned and of the novel and improved character set forth, which are made of straight strip material sharpened along one edge, and in particular avoiding the use of a blade having arms in angular relation.

Still a further object of this invention is to provide novel and improved knives and blades of the kind mentioned, which are easy and reasonably cheap to manufacture, where the blades for straight knives and those for use as linoleum cutters are made of the same strip material, and which articles are efficient in carrying out the functions for which they are designed, easy to assemble, disassemble and use.

Other objects and advantages will become apparent as this disclosure proceeds.

In the accompanying drawings forming part of this specification, similar characters of reference indicate corresponding parts in all the views.

Fig. 1 is a perspective view of a two-part handle used to clamp and hold blades extending therefrom. The left-hand end of the handle shown in this view, is the blade-receiving end thereof.

Fig. 2 and 3, are perspective views of the two handle parts particularly showing their interiors respectively and their mating edges.

Fig. 4 is a perspective view of a blade for use in said handle, thereby affording a knife for cutting linoleum and the like.

Fig. 5 shows the blade of Fig. 4 mounted on one of the handle parts. Here, upon assembly of the handle parts, the knife is of the linoleum-cutting type. An additional notch is here shown in the blade. This as will be explained, permits the blade to be set to extend longitudinally of the handle if desired, so that a single blade may serve in both mentioned positions with respect to the handle.

Fig. 6 shows a blade for use as a straight knife when held in said handle of Fig. 1.

Fig. 7 shows the blade illustrated in Fig. 6 mounted on one of the handle parts.

In the drawings, the numeral 15 indicates generally a knife handle made up of two halves, designated in general by the numerals 16 and 17 respectively. The blade-receiving end of the handle part 16 is a channel 18 of the width of the blades 19 and 20, it is to receive. The blade-receiving end of the handle part 17, has an element 21 intermediate its longitudinal sides and extending from its inner face. This element 21, on assembly of the handle halves by the screw 22, sits within the channel 18 and acts to clamp the blades securely within the handle. For proper association of the handle parts, pins 23 are provided, to locate in suitable sockets 24 therefor respectively. For the screw 22, the clear hole 25 and the threaded hole 26, are provided in the handle halves respectively. The lug or pin 27 extends from the channel wall 18' into the channel for the engagement of the blade 19 in notch 28, or the blade 20, in any of the notches 29. The cut-out 30, in the projection or as here shown the pad 21, is provided to clear the blade locating lug 27.

The blade 19 is made of strip steel material similar to that used for the blade 20, and thus avoids the angular blade structure shown in Fig. 6 to comprise the angular arm 31 shown in dotted lines which would be contiguous with the arm represented by the blade 20. This blade 19, in its sharpened edge 32, is provided with the notch 33, which is for engagement with the free side end 18''' of the channel wall 18''. The angle A which is made by the edges of the blade 19 which are engaged by the handle part 16, is made such that the angle B which is made by the cutting edge 32 with the bottom edge of the handle 15, shall be obtuse a predetermined degree suitable for linoleum cutting. To aid prevention in the splitting of the blade, and also for convenience in manufacture, the vertex of the notch 33 may end in a circle 34.

The same blade 19, if furnished with the notch 35 in its edge opposite cutting edge 32, and if of a width equal to the distance between the inside surfaces of the side walls of the channel 18, may be set in the handle as shown in Fig. 5 for use as a linoleum cutter. When set so that pin 27 engages the notch 35, said blade will extend straight out of the handle in the fashion as blade 20 does in Fig. 7. The position of such notch 35 should be such that notch 33 is within the handle when blade 19' is used extending straight from the handle.

The handle 15, as seen, is adapted for use with blades as 19, 19' and 20, a plurality of which may be furnished to be stored in the hollows 36 and 37 of the handle parts.

This invention is capable of numerous forms and various applications without departing from the essential features herein set forth. It is therefore intended and desired that the embodiment shown herein be deemed illustrative and not restrictive and that the patent shall cover all patentable novelty herein set forth; reference being had to the following claims rather than to the specific description herein to indicate the scope of this invention.

I claim:

1. In a knife, an elongated handle member having a lengthwise channel at one end thereof; said channel being open at said end and having a floor wall between two side walls, an element extending from one of said side walls into the channel, a flat cutting blade having two edges thereof in angular relation and provided with a notch in each of said edges respectively; said blade being positioned partly in said channel, lying with one of its side surfaces on the floor wall of said channel; one end of the other of said side walls of the channel at said open end of said channel engaging said blade in one of said notches and said element which extends into the channel engaging said blade in the other of said notches; the said blade having a sharpened edge exterior said handle member, commencing at least from the notch which is engaged by the said end of the other of said side walls of the channel and a member forming an openable clamp with said handle member; said clamp holding said blade.

2. The knife as defined in claim 1, wherein the sharpened edge of the blade is an elongation of that edge of said blade having the notch which engages the end of the other of said side walls of the channel.

3. The knife as defined in claim 1, wherein the edge of the blade having the notch which is engaged by the element extending into the channel is in abutment with the said one of said side walls of said channel, within said channel.

References Cited in the file of this patent

UNITED STATES PATENTS

| Number | Name | Date |
|---|---|---|
| 1,651,856 | Weiss | Dec. 6, 1927 |
| 1,813,498 | Kosunen | July 7, 1931 |
| 2,222,328 | Ward | Nov. 19, 1940 |
| 2,272,805 | Jaasund et al. | Feb. 10, 1942 |
| 2,459,407 | Beaver | Jan. 18, 1949 |